UNITED STATES PATENT OFFICE.

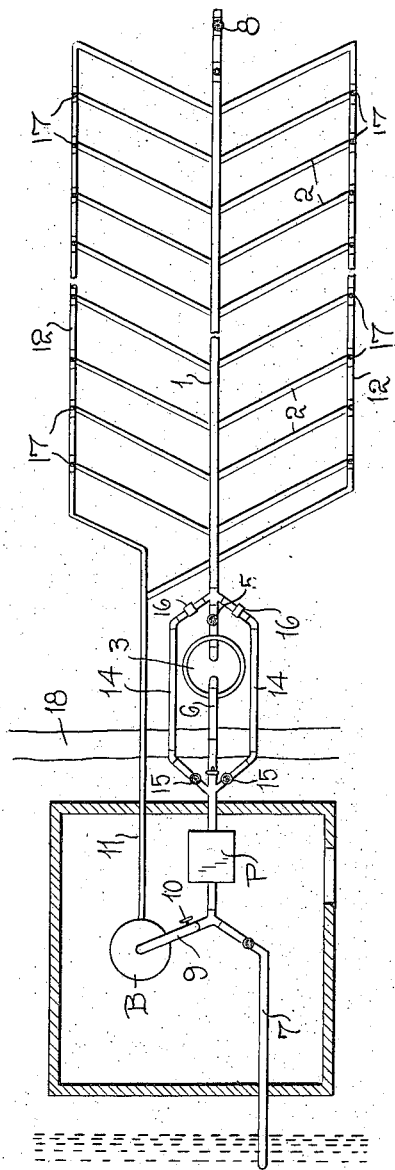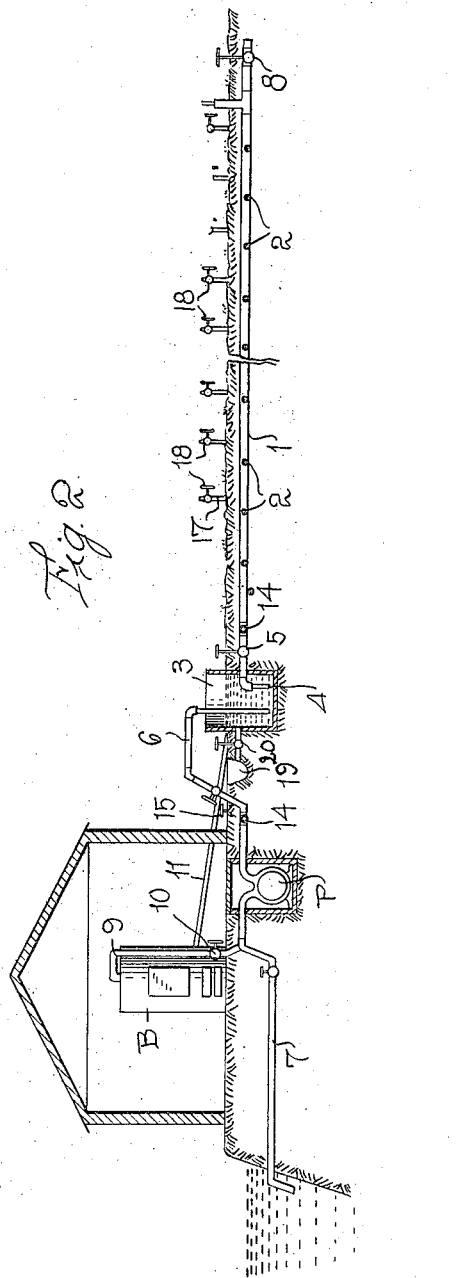

JOHN STEELQUIST, OF PORTLAND, OREGON.

APPARATUS FOR TREATING SOIL.

1,281,427. Specification of Letters Patent. Patented Oct. 15, 1918.

Application filed September 6, 1917. Serial No. 190,001.

*To all whom it may concern:*

Be it known that I, JOHN STEELQUIST, a citizen of the United States, residing at Portland, in the county of Multnomah and State of Oregon, have invented certain new and useful Improvements in Apparatus for Treating Soil, of which the following is a specification, reference being had to the accompanying drawings.

This invention relates to an apparatus for treating soil and is an improvement on my prior apparatus embodied in my allowed application, prior Patent No. 1,247,166, dated November 20, 1917, and it is an object of the invention to provide an apparatus of this general character having novel and improved means whereby the same may be employed to furnish a supply of heated water to the soil beneath the surface thereof together with means for returning the undelivered water to the source of supply.

It is also an object of the invention to provide an apparatus of this general character including a main conduit provided with laterals, together with means co-acting with the laterals for flooding the surface of the soil.

The invention consists in the details of construction and in the combination and arrangement of the several parts of my improved apparatus wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein:

Figure 1 is a view partly in top plan and partly in section illustrating an apparatus constructed in accordance with an embodiment of my invention, said figure being somewhat of a diagrammatic character; and Fig. 2 is a view partly in side elevation and partly in section of the apparatus as disclosed in Fig. 1.

As disclosed in the accompanying drawings 1 denotes a main conduit either porous or perforate and adapted to be positioned a predetermined distance below the upper surface of the soil to be treated and in communication with said main conduit are the laterals 2 arranged in oppositely directed series.

3 denotes a sump or reservoir having its bottom below the level of the outer end of the main conduit 1 and having its top terminating above the surface of the soil whereby ample room is afforded for drainage water together with sufficient pressure for irrigation. One end portion of the conduit 1 extends within the sump or reservoir 3 and is provided therein with the depending extension 4 terminating in close proximity to the bottom of the sump or reservoir 3. Interposed in said conduit 1 exteriorly of the sump or reservoir 3 but preferably adjacent thereto is the globe valve 5.

Extending within the sump or reservoir 3 through the top or open end thereof is the pipe or conduit 6 leading from the pump P and said pipe 6 serves as either the suction or discharge for said pump P in accordance with the use to which the apparatus may be put. Also in communication with the pump P is the valve controlled piping 7 which may also operate as either a suction or discharge and which leads from a suitable source of water supply. The outer end portion of the main conduit 1 has interposed therein a controlling valve 8.

B denotes a boiler for heating water and in suitable communication with the boiler B is the lead 9 also in communication with the piping 7 and interposed in said lead 9 is the controlling valve 10. 11 denotes a return pipe in communication with the boiler B and which is provided with the branches 12 with which the outer ends of the laterals 2 communicate so that the heated water which is not absorbed by the soil may be returned to the boiler B. The heated water from the boiler B is caused to travel by the sump or reservoir 3 by the by-passes 14 co-acting with the pipe 6 and the main conduit 1 and which are in communication with the conduit 1 in advance of the valve 5. The by-passes 14 are provided with the controlling valves 15 and also interposed within the by-passes 14 are the check valves 16 of any desired construction which serve to prevent retrograde flow through said by-passes.

In communication with the outer end portion of each of the laterals 2 is a vertically disposed pipe 17 terminating above the surface of the soil so that the water flowing therethrough from the sump or reservoir 3 or from the boiler B may be caused to flood the surface of the ground. Interposed in each of the pipes 17 is a controlling valve 18 so that the discharge of water from each of the pipes 17 may be controlled independently of the other in accordance with the requirements of practice.

Through the medium of the ditch 19 and the valve controlled pipe 20 it will be at once self evident that the water collected within the sump or reservoir 3 may be readily drained off when the pump P is not in use and it will also be understood that the ditch 19 and the pipe 20 will serve to maintain the water within the sump or reservoir 3 at a predetermined level when used for the purpose of irrigation.

From the foregoing description, it is thought to be obvious that an apparatus constructed in accordance with my invention is particularly well adapted for use by reason of the convenience and facility with which it may be assembled and operated and it will also be obvious that my invention is susceptible of some change and modification without materially departing from the principle and spirit thereof and for this reason I do not wish to be understood as limiting myself to the precise arrangement and formation of the several parts herein shown in carrying out my invention in practice except as hereinafter claimed.

I claim:

An apparatus of the class described comprising a main conduit leading from a source of fluid supply and having laterals in communication therewith, said laterals being arranged in oppositely directed series, a return pipe in communication with the source of supply and having branches in communication with the outer end portions of the laterals, the outer end portion of each of the laterals having in communication therewith a vertically disposed discharge pipe, and a controlling valve interposed in each of said upstanding discharge pipes.

In testimony whereof I hereunto affix my signature in the presence of two witnesses.

JOHN STEELQUIST.

Witnesses:
S. F. WILSON,
H. ASHLEY ELY.